July 19, 1960 H. A. SCHLATTER 2,945,940
RESISTANCE WELDING PROCESS
Filed Oct. 9, 1958
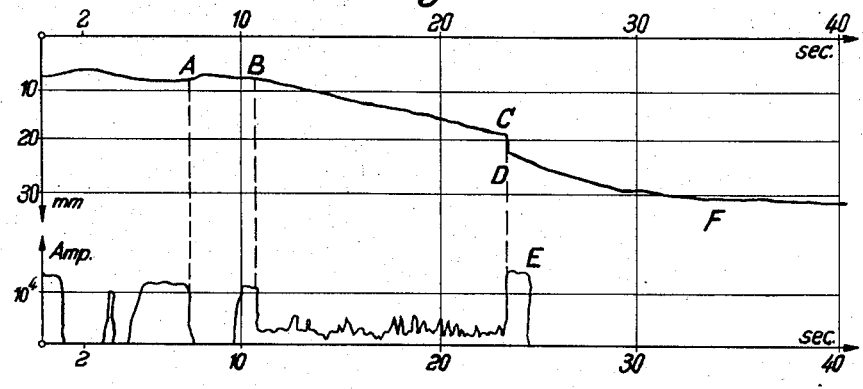
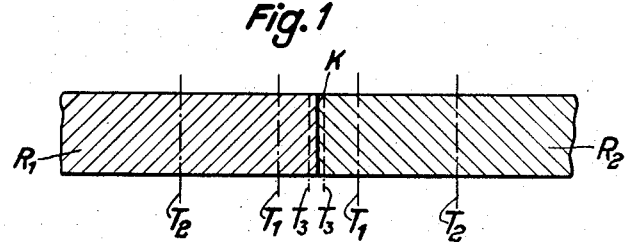
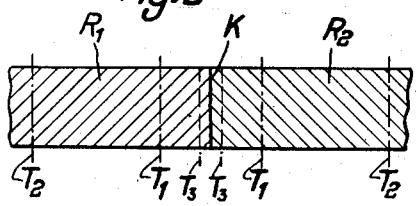
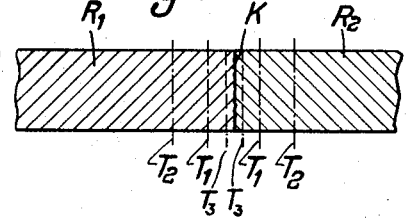
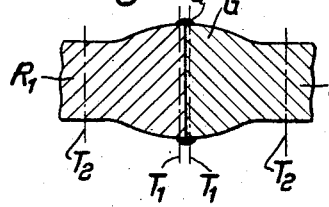
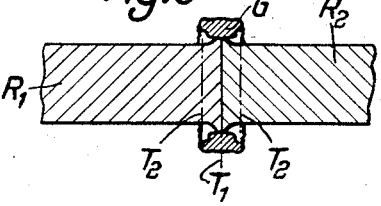
Inventor:
Hans A. Schlatter
by: Michael S. Striker
Atty.

United States Patent Office 2,945,940
Patented July 19, 1960

2,945,940
RESISTANCE WELDING PROCESS

Hans A. Schlatter, Zollikon, Zurich, Switzerland, assignor to H. A. Schlatter, Aktiengesellschaft, Zollikon, Zurich, Switzerland Filed Oct. 9, 1958, Ser. No. 766,295

Claims priority, application Switzerland Oct. 11, 1957

2 Claims. (Cl. 219—100)

The present invention concerns the process of electrical resistance welding, and more particularly a flash-butt welding process which is specially suitable for joining rails, beams or similar members of steel, for instance, the type of steel used for railroad and trolley rails, alloy steels, stainless steels and various types of light metal. The invention is particularly advantageously applicable to the process of butt welding of members having a comparatively large cross-sectional area.

In the conventional process of flash-butt welding of steel the members to be joined and connected to a source of welding current are first preheated at their butts by causing the latter to contact each other periodically and repeatedly. In this first step of the operation the very ends of the members become heated to welding temperature, so that they are in semi-liquid condition. Hereafter the butts of the members to be joined are "flashed" by forcing the members towards each other with the result that the metal material burns off at the points of contact which is the end area or surface of the individual members. Some of the metal evaporates together with foreign matter that may exist at the butt faces, and the feed of the members toward each other is maintained for a certain period of time during this flashing operation. Immediately thereafter the welding current is switched off and the members are pushed or forced towards each other from which an upset butt welding results. The metal at the joint is upset by being squeezed out in lateral direction so that a substantial bulge or flash is formed which has to be subsequently removed.

It is to be noted that in flash-butt resistance welding of aluminum no preheating is carried out but the butts are flashed and upset in one operation.

It has been observed that in the conventional flash-butt resistance welding process, the boundary between that portion of the member which is in semi-liquid state and that portion which is in plastic or forgeable condition as well as the boundary between the portion in plastic or forgeable condition and the portion which is in solid condition move due to thermal conductivity away from the joint at least at the same rate of speed at which material is being burned away at the extreme end or butt surface of the particular member. Consequently, at the end of the flashing operation, the dimension in longitudinal direction of the member, of the plastic or forgeable as well as that of semi-liquid portion of the member is at least as great as it was before the actual flashing operation. The consequence of this phenomenon is that in the ensuing pressure upsetting operation the viscous material is displaced in lateral direction from the welding area and has to be removed later. The whole plastic or forgeable portion of the two welded members is upset to form a substantial bulge. This bulge portion must usually be annealed afterwards in order to obtain a satisfactory structure condition of the welded portions.

It is a main object of the present invention to provide for a process which results in a weld which does not require subsequent annealing and which nevertheless yields a final welded product which has in the area of the weld a structure which is very similar to the original structure of the material before the welding operation and therefore has excellent tensile and shear strength.

It is another object of this invention to provide a welding process of the type set forth which requires only a minimum of subsequent mechanical work for removing excess or bulge material.

With above objects in mind, the present invention provides in a flash-butt resistance welding process, the steps of flashing by applying current to two pieces to be welded together and feeding them towards each other, the portion of each of said members substantially adjacent the area of contact between the same being in semi-liquid condition and the portion adjacent thereto being in forgeable condition, and the boundary plane between these portions of each of the members moving during said flashing away from the area of contact at a certain speed; and moving during such flashing said members toward each other first at a first feeding speed faster than said certain speed of the movement of said boundary layers away from each other, and after a certain period of flashing moving said members toward each other at a second feeding speed substantially increased over said first feeding speed so as to move said boundary layers substantially into contact with each other and weld said portions being in forgeable condition directly to each other.

Preferably, the change from said first feeding speed to said second feeding speed of a greater velocity is carried out with a sudden surge of pressure so that the material being in semi-liquid condition is substantially completely squeezed out in lateral direction from the welding area and the portions being in forgeable condition are only slightly upset.

It can be seen that in the process according to the invention the temperature gradient in the material in a direction substantially perpendicular to the area of contact is steeper after the flashing operation than it was at the beginning thereof, or even as it was during a possibly preceding preheating operation. Consequently, the longitudinal dimensions of the heated portions of the two members to be welded decrease during the flashing operation. For instance, in certain cases the longitudinal dimension of the portion which is in forgeable condition may decrease during the flashing operation to less than 10 mm. During the actual welding and upsetting operation the pressure applied to the pieces and the feeding speed are to be chosen so great that practically the entire semi-liquid material is forced out of the welding zone in lateral direction in such a manner that it forms a sort of toroidal bead which is connected with the welding joint only by a comparatively small fin. This toroidal bead can be knocked off very easily without any machining operation. The great upsetting pressure has the advantageous effect that all the material which has been thermally affected during the flashing operation does not remain in the weld joint area. In addition, however, the forgeable portions of the pieces to be welded together are brought into direct contact with each other and are thoroughly welded or forged together on account of the high upsetting pressure applied to the pieces. Therefore, the material at the weld joint will have a structure which is very similar to that which it had before the welding operation and therefore has excellent tensile and shear strength, thereby eliminating the necessity of subsequent annealing. It has been found that under the above described conditions the weld joint does not show, after the completion of the whole welding operation, any substantial bulge or upset in spite of the application of very high pressure, because the portion that had been left in forgeable condition has only a comparatively small longitudinal dimension while the semi-liquid material has been substantially completely squeezed out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 illustrates diagrammatically the starting stage of the welding process, as applied for example to two rails to be welded together;

Figs. 2 and 3 illustrate in a similar way two consecutive stages of the method as carried out conventionally;

Figs. 4 and 5 illustrate in a similar manner the corresponding stages of the process according to the invention; and Fig. 6 is a diagram illustrating the welding process in two graphs, one being plotted as feed travel distance versus time, and the other plotted as amperes versus time.

In Figs. 1 to 5, $R^1$ and $R^2$ indicate the ends or butts of two rails to be welded together, the rails being shown in longitudinal section. The rails are shown with all the details connected therewith in all the Figures 1 to 5 at the same scale which is of some significance in this case because certain proportions between elements of these figures are significant for the description of the process. In Figs. 1 to 5 a number of dash-dotted lines are shown which are marked $T^1$, $T^2$ and $T^3$, respectively. These lines indicate the location of planes transversal to the longitudinal direction of the rails, i.e. perpendicular to the plane of the drawing.

The contact area between the two rails $R^1$ and $R^2$ is indicated by a heavy line K. The above-mentioned lines $T^1$, $T^2$ and $T^3$ are to be understood as boundary planes separating portions of the rails which are in a different condition at certain phases of the process. The portion of material contained between the contact area K and the planes $T^3$ is white-hot and liquid, the portions contained between the planes $T^3$ and $T^1$ are semi-liquid corresponding to the condition which in the well known metallurgical diagrams is illustrated by the area between the so-called solidus and the liquidus line. The portion of material located between the planes $T^1$ and $T^2$ is plastic or forgeable.

If, in a flash-butt resistance welding process preheating is used then after the preheating operation which is known per se the conditions prevailing are those which are illustrated by Fig. 1. It is evident that the temperature in the material of the rails drops from a maximum existing at or near the contact area K and decreases from this maximum in a direction away from the area K which explains the above mentioned different conditions in the portions of the rails contained between the above described boundary planes.

During the subsequent flashing operation, according to the conventional method illustrated in Fig. 2, the boundary planes $T^1$ and $T^2$ were permitted to move away from the contact area K, due to thermal conductivity of the metal, in such a manner that the distances between K and $T^1$ as well as the distances between $T^1$ and $T^2$ increased. This was due to the fact that the velocity or speed of feeding the rails $R^1$ and $R^2$ towards each other was entirely depending upon the degree of removal of material through the flashing operation in the contact area, the feeding speed being slower than the speed of the movement of the boundaries $T^1$ and $T^2$ away from the area K. Consequently, in certain cases the spacing between the boundary planes $T^1$ and $T^2$ used to be for example between 20 and 40 mm. at the end of the flashing operation. If then in the conventional manner subsequently pressure was applied in the upsetting operation, then the plastic or forgeable material located between the planes $T^1$ and $T^2$ was deformed or laterally displaced so as to form a substantial bulge G, while the semi-liquid portions were stretched out to a comparatively thinner layer between the planes $T^1$ shown in Fig. 3, and finally the liquid material portion between the planes $T^3$ formed an annular flash or small bulge G' as also illustrated in Fig. 3. It is quite evident that the substantial bulge G and the smaller annular bulge G' had to be removed subsequently by a rather inconvenient machining operation. On top of it, the portion between the planes $T^1$ having been heated to semi-liquid state was necessarily affected regarding its structure or qualities and had to be reconditioned by subsequent annealing.

In contrast therewith, according to the present invention, the flashing operation is carried out with a feeding speed and an intensity of current of such as magnitude that the material in the contact area is removed by the flashing more rapidly than the heat moves into the material of the rails away from the contact area K, i.e. the feeding speed is greater than the feed of the movement of the boundary planes $T^1$ and $T^2$ away from the area K, as is illustrated by Fig. 4. Consequently, the spacings between the planes $T^1$ and $T^2$, as well as between the planes $T^1$ and $T^3$ decrease continuously during the flashing operation and may in certain cases decrease to 10 mm. or even less. As soon as the flashing operation is completed the upsetting operation is immediately started. In accordance with the invention the feeding speed of the rails and the pressure applied thereto is caused suddenly to undergo a very substantial surge so that practically all the material contained between the boundary planes $T^1$ of the two rails is squeezed out in lateral direction from the welding area and the portions between the boundary planes $T^1$ and $T^2$ of the two respective rails $R^1$ and $R^2$ are brought into direct contact with each other as shown in Fig. 5 so that the welding is effected under pressure directly between the two portions of the rails which are in forgeable condition. Consequently, the upset bulge appearing at the weld joint remains comparatively small as can be seen also from Fig. 5. The material which had been liquid or semi-liquid is entirely removed from the weld joint and forms a toroidal red-hot shape G" surrounding the weld joint and connected with the previously mentioned small bulge by only a very small area which may be a small fin so that this excess material in the toroidal shape G" can easily be knocked off and removed without any requirement of a machine operation. The cross-section of the torus G" is approximately mushroom shaped. After this torus is removed the small bulge around the weld joint can immediately be removed by applying a cutting tool while the material in this area has still a temperature of approxiamtely 850° C.

If, for instance, rails as used for railroads or trolley tracks are being welded together according to the present invention, the temperature in the semi-liquid portion of the rails, contained between the planes $T^1$ and $T^3$ amounts to approximately 1150 to 1250° C. while the temperature in the forgeable portion between the planes $T^1$ and $T^2$ amounts to approximately 900 to 1150° C.

Referring now to Fig. 6, the process according to the invention is illustrated in the form of a graph, the abscissa is time in seconds, while the ordinate in the upper portion of the diagram illustrates the amount of feed or travel of the individual rails with respect to the contact area K, while the ordinate in the lower portion of the diagram shows the strength of the current in amperes. Specifically, this diagram has been taken from a welding operation concerning the joining of two rails having approximately 10,000 mm.² cross-sectional area. At the point A the preheating operation is completed which is carried out in the conventional manner by periodically and intermittently causing the end faces or butts of the rails to contact each other while at the same time a current is applied thereto. At the point B the flashing operation starts, the feeding speed being approximately 1.2 mm. per second and amounts to a travel of approximately 15 to 20 mm. It is clear therefore that from each rail end approximately 8 mm. have been removed by burning away or flashing until at the point C a sudden surge of pressure sets in. This constitutes the start of the upsetting operation. During this operation the feeding speed suddenly rises to approximately 0.5 to 2 meters per second. The travel or movement carried out until the point D is reached, amounts to approximately 5 mm. During this first portion of the upsetting operation the liquid and semi-liquid portions of both rails are squeezed out laterally from the contact area. Thereupon follows the second portion of the upsetting operation extending from the point D to the point F which extends over a period of approximately 6 to 7 seconds, during which operation the contacting butts of the rails are pressure forged together, the still plastic portions between the planes $T^2$ of the two rails as shown in Fig. 5 being compressed under a pressure between 5 and 10 kg. per mm.$^2$ which results only in a very small bulging effect. The current has been disconnected already at the point E. The feeding speed between the points D and F depends upon the degree of yield appearing in the material which is contained in the forgeable portions. Consequently, this feeding speed decreases continuously as the forging operation and the cooling of the material proceeds.

It is evident that the actual joint which is surrounded by the squeezed out torus G" is the last portion to harden and therefore is subjected, in the last moment of the operation, to a very high forging pressure. This results in a high quality weld.

The above described step of executing the flashing operation at an increased speed is of particular significance if the members to be welded consist of aluminum alloys, e.g. of the type known under the trade name "Anticorodal." In this case the speed of removal of material by burning away in the contact area amounts, for instance, up to 6 mm./sec. and the movement or travel of the members being welded under the corresponding feeding speed may amount to 60 mm. During the upsetting operation immediately following the flashing operation pressures between 20 and 25 kg./mm.$^2$ are applied.

It will be understood that each of the elements described above, or two or more together, may also find a useful application in other types of welding process differing from the types described above.

While the invention has been illustrated and described as embodied in flash-butt resistance welding process, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adptations should and are intended to be comprehended within the meaning and range of equivalence of the following claims.

What is claimed as new and desired to be secured by Letters Patent is:

1. In a flash-butt resistance welding process, the steps of: flashing by applying current to two pieces to be welded together and feeding them towards each other, the portion of each of said members substantially adjacent the area of contact between the same being in semi-liquid condition and the portion adjacent thereto being in forgeable condition, and the boundary plane between these portions of each of the members moving during said flashing away from the area of contact at a certain speed; and moving during such flashing said members toward each other first at a first feeding speed faster than said certain speed of the momement of said boundary layers away from each other, and after a certain period of flashing moving said members toward each other at a second feeding speed substantially increased over said first feeding speed so as to move said boundary layers substantially into contact with each other and weld said portions being in forgeable condition directly to each other.

2. In a flash-butt welding process, the steps of periodically causing contact between the butt surfaces of the pieces to be welded under application of comparatively moderate pressure and current across the contacting butt surfaces for causing preheating of the material in the areas adjacent to said surfaces; flashing by applying current to two pieces to be welded together and feeding them towards each other, the portion of each of said members substantially adjacent the area of contact between the same being in semi-liquid condition and the portion adjacent thereto being in forgeable condition, and the boundary plane between these portions of each of the members moving during said flashing away from the area of contact at a certain speed; and moving during such flashing said members toward each other first at a first feeding speed faster than said certain speed of the movement of said boundary layers away from each other, and after a certain period of flashing moving said members toward each other at a second feeding speed substantially increased over said first feeding speed so as to move said boundary layers substantially into contact with each other and weld said portions being in forgeable condition directly to each other.

References Cited in the file of this patent
UNITED STATES PATENTS

| | | |
|---|---|---|
| 1,342,957 | Gravell | June 8, 1920 |
| 1,780,297 | Heineman | Nov. 4, 1930 |
| 1,976,342 | Heineman | Oct. 9, 1934 |
| 2,085,583 | Hanson | June 29, 1937 |